United States Patent
Maeoka et al.

(10) Patent No.: US 8,589,303 B2
(45) Date of Patent: Nov. 19, 2013

(54) ASSET MANAGEMENT APPARATUS AND ASSET MANAGEMENT METHOD

(75) Inventors: Jun Maeoka, Yokohama (JP); Yoshiaki Morimoto, Kawasaki (JP); Akira Ioku, Tokyo (JP); Koji Doi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 748 days.

(21) Appl. No.: 11/645,597

(22) Filed: Dec. 27, 2006

(65) Prior Publication Data

US 2007/0174311 A1 Jul. 26, 2007

(30) Foreign Application Priority Data

Dec. 27, 2005 (JP) ................................. 2005-376382

(51) Int. Cl.
*G06F 21/00* (2006.01)
(52) U.S. Cl.
USPC .......................................................... 705/56
(58) Field of Classification Search
USPC ............................................. 395/712; 380/4
See application file for complete search history.

(56) References Cited

U.S. PATENT DOCUMENTS 5,754,864 A * 5/1998 Hill .............................. 717/173
7,131,144 B2 * 10/2006 Rabin et al. ..................... 726/30

FOREIGN PATENT DOCUMENTS

| JP | 10-254712 | 9/1998 |
| JP | 2001-222424 | 8/2001 |
| JP | 2004-178121 | 6/2004 |

* cited by examiner

*Primary Examiner* — Calvin L Hewitt, II
*Assistant Examiner* — Khalif Muhammad
(74) *Attorney, Agent, or Firm* — Antonelli, Terry, Stout & Kraus, LLP.

(57) ABSTRACT

An asset management apparatus includes a processor for conducting arithmetic operation processing and a storage device, and executes an asset management program to detect unfairness. The asset management program includes a common asset management part common to the asset management apparatus and other devices, and a device specific asset management part specific to the asset management apparatus. The asset management apparatus acquires the device specific asset management part and device specific part setting information. When executing the asset management program, the asset management apparatus refers to the device specific part setting information, links the device specific asset management part to the asset management program, and executes the linked asset management program.

8 Claims, 6 Drawing Sheets

FIG.3

| 171 | 172 | 173 | 174 | 175 | |
|---|---|---|---|---|---|
| SETTING NUMBER | SETTING SUBJECT PROGRAM | INTRA-PROGRAM LOCATION | SETTING PROCESSING | SUBJECT DEVICE NAME | |
| 1 | ASSET MANAGEMENT PROGRAM | ADDRESS 0001 | INSTRUCTION CODE 1' (BRANCH INSTRUCTION TO DEVICE SPECIFIC ASSET MANAGEMENT MODULE) | ABC-1 | ~1710 |
| 2 | ALL | ALL CALLING PLACES IN outFunction FUNCTION GROUP | INSTRUCTION CODE Z (NOP INSTRUCTION AND SO ON) | ABC-1 | ~1711 |
| ⋮ | ⋮ | ⋮ | ⋮ | ⋮ | |

FIG.4

```
          40              41               42
LABEL001 :
  ADDRESS 0001   INSTRUCTION CODE 1   FINISH
  ADDRESS 0002   INSTRUCTION CODE 2   BRANCH TO COMMON ASSET MANAGEMENT PART
  ADDRESS 0003   INSTRUCTION CODE 3   REFER TO DECISION RESULT
  ADDRESS 0004   INSTRUCTION CODE 4   CONDITIONAL BRANCH: IF TRUE, BRANCH TO LABEL 002
  ADDRESS 0005   INSTRUCTION CODE 5   FINISH

LABEL002 :
  ADDRESS 0006   INSTRUCTION CODE 6   START CONTENTS REPRODUCTION PROCESSING
```

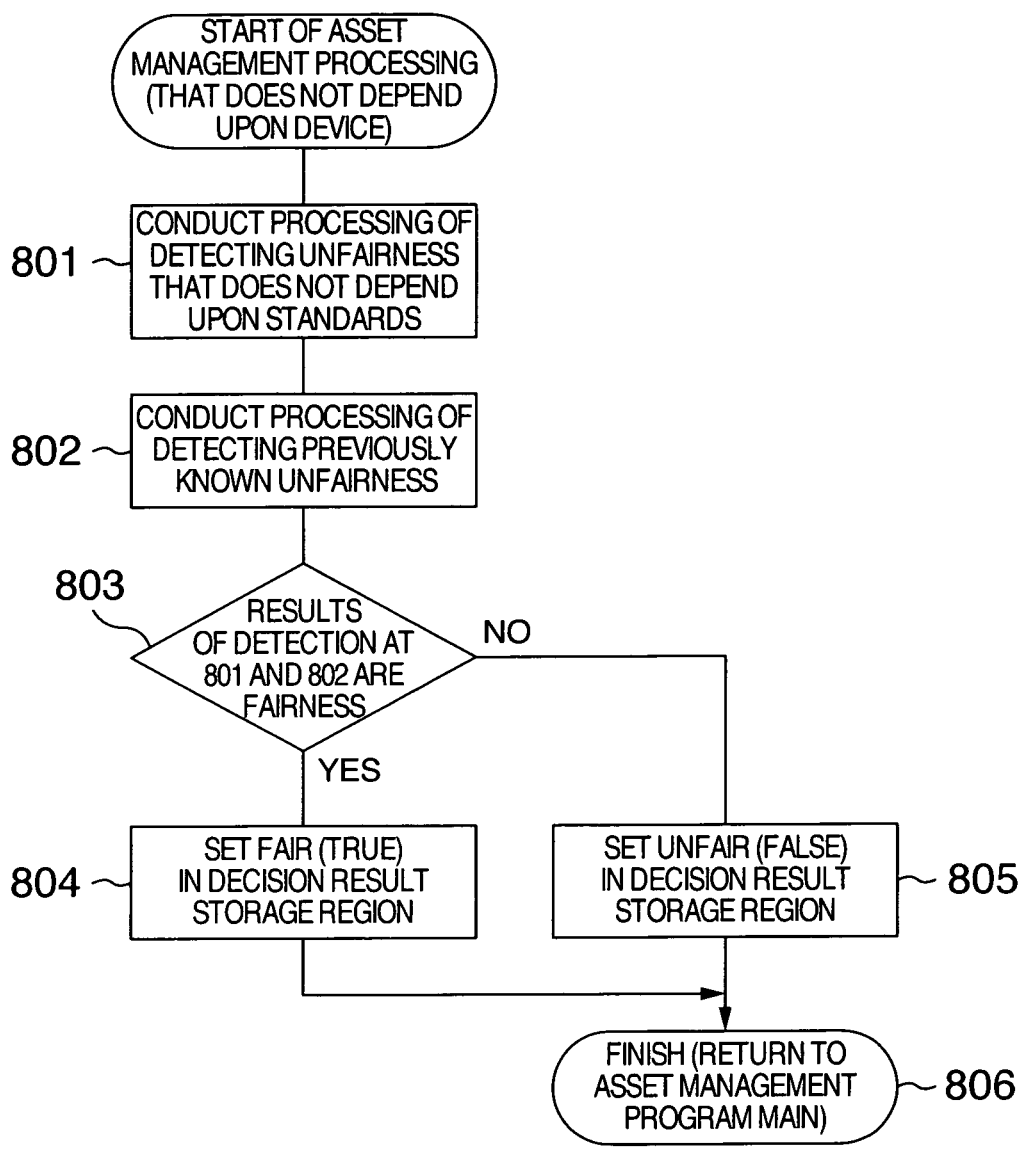

ASSET MANAGEMENT APPARATUS AND ASSET MANAGEMENT METHOD

CROSS-REFERENCE TO RELATED APPLICATION

This application claims priority from Japanese Patent Application JP 2005-376382, filed on Dec. 27, 2005, the content of which is hereby incorporated by reference into this application.

BACKGROUND OF THE INVENTION

The present invention relates to improvement of the asset management efficiency and effect.

Herein, a mechanism for preventing piracy and a mechanism for detecting a virus or the like are broadly referred to as asset management or software management.

In order to conduct such asset management, there is an asset management program for detecting unfairness. Herein, "unfairness" means unfair software (for example, software containing a virus or the like and software that makes unfair copy possible) and unfair copy. In addition, among asset management programs, there are programs that remove unfair software.

A method of selling and distributing storage media (such as DVDs) in which an asset management program for detecting unfairness has been written at the time of manufacturing is known (BD+ technique). According to this technique, a reproducing device (such as a DVD player) for reproducing contents stored in a storage medium executes the asset management program by using an interpreter formed of a virtual machine (VM) mounted on the reproducing device.

This method has a feature that the asset management program can be executed in a wide variety of reproducing devices because the reproducing device executes the asset management program by using the interpreter. According to this method, the asset management program can be executed for a personal computer (PC) or a car navigation system which emulates the reproducing function on the device and reproduces contents.

Here, the interpreter is a different program for interpreting and executing a language (an intermediate language) that is set and that is different from a machine language of an executing device, on the executing device. The interpreter executes an intermediate language program translated from a program described by using a high level language.

A method of executing a program described by using a high level language on a device by using a compiler is also known. The compiler translates a program described by using a high level language to a program of a machine language of an executing device and directly executes the machine program obtained after translation.

The interpreter can eliminate the following drawbacks of the compiler (JP-A-10-254712).

(Drawback 1 of the compiler) A compiler for translating a source program to a machine language program is needed for each device. The development quantity of the compiler becomes large. Furthermore, it is necessary to conduct maintenance and expansion for each device. As a result, the overhead of the maintenance and expansion becomes large.

(Drawback 2 of the compiler) When executing the same program in a plurality of devices, compiling (translation from a source program to a machine language program) is necessary for each device. The overhead of the management of the machine language program is large.

(Drawback 3 of the compiler) Even if programs have the same contents in an environment in which a plurality of devices are connected via a network, a plurality of machine language programs are needed respectively in association with devices, resulting in problems in version management and disk space. Furthermore, it is difficult to execute the same program dispersively.

(Drawback 4 of the compiler) In some systems actually operated, there is no source program and the system is operated by using only a machine language program. In such systems, it is difficult to shift and change constituent devices. While the computer architecture is sophisticated by advance in hardware technique, intense restrictions are imposed on architecture changes to inherit the machine language program asset.

However, the asset management program must cope with a wide variety of devices. Therefore, the interpreter is more suitable for the asset management program than the compiler.

An asset management method for managing a software license is described in JP-A-2001-222424. However, this method can be executed only for devices connected to a network.

Furthermore, a method of writing an asset management program onto a storage medium (such as a CD or a DVD) together with contents to detect unfairness such as illegal copy is known (BD+ technique). Unlike the method described in JP-A-2001-222424, this method makes it possible to execute the asset management program certainly for small-sized devices having excellent portability and devices that are not connected to a network as well. In this method, however, the asset management program is written onto the storage medium, and consequently it is difficult to detect the latest unfair program that has appeared after the writing. In recent years, contents such as moving pictures and voices can be reproduced not only by dedicated devices but also devices capable of emulating the reproduction function and conducting reproduction (such as car navigation systems and personal computers). The asset management program must cope with these devices as well. Therefore, the asset management program must include programs specific to respective devices. As a result, the data quantity of the asset management program becomes large.

In the method, the data quantity of the asset management program thus increases. However, the data quantity in the storage medium is constant. In the method, therefore, there is a problem that the contents writing area is decreased. In addition, there is a problem that the asset management program cannot cope with a device sold after the asset management program has been written.

An asset management method that makes it possible to conduct asset management for a movable client terminal or a client terminal that is not connected to a network is described in JP-A-2004-178121.

In the protection technique such as the BD+ technique described above and the method described in JP-A-2004-178121, the data quantity for the asset management program is increased by an increase of kinds of reproducible reproducing devices. This results in a problem that the overhead at the time of execution of the asset management program increases. There is also a problem that it takes much time when delivering the asset management program to a reproducing device or when updating the asset management program.

SUMMARY OF THE INVENTION

An object of the present invention is to provide an asset management method that facilitates the update of the asset management program in order to cope with unfair programs which appear one after another.

Another object of the present invention is to provide an asset management method that makes asset management possible with a minimum execution quantity for each reproducible device, without increasing the data quantity for the asset management program regardless of an increase of devices that can reproduce contents and an increase of kinds of unfair programs.

In order to achieve the objects, an asset management apparatus according to the present invention includes a processor for conducting arithmetic operation processing and a storage device, and executes an asset management program to detect unfairness. The asset management program includes a common asset management part common to the asset management apparatus and other devices, and a device specific asset management part specific to the asset management apparatus. The asset management apparatus acquires the device specific asset management part and device specific part setting information. When executing the asset management program, the asset management apparatus refers to the device specific part setting information, links the device specific asset management part to the asset management program, and executes the linked asset management program.

According to the present invention, an asset management method that facilitates the update of the asset management program can be provided.

BRIEF DESCRIPTION OF THE DRAWINGS

FIG. 3 is a configuration diagram of a device specific part setting table in an embodiment of the present invention;

FIG. 4 is a diagram showing a program configuration of an asset management program obtained before linkage processing is executed in an embodiment of the present invention;

FIG. 7 is a flow chart of an common asset management part in an embodiment of the present invention.

DESCRIPTION OF THE EMBODIMENTS

Hereafter, embodiments of the present invention will be described with reference to the drawings.

Figure 1:
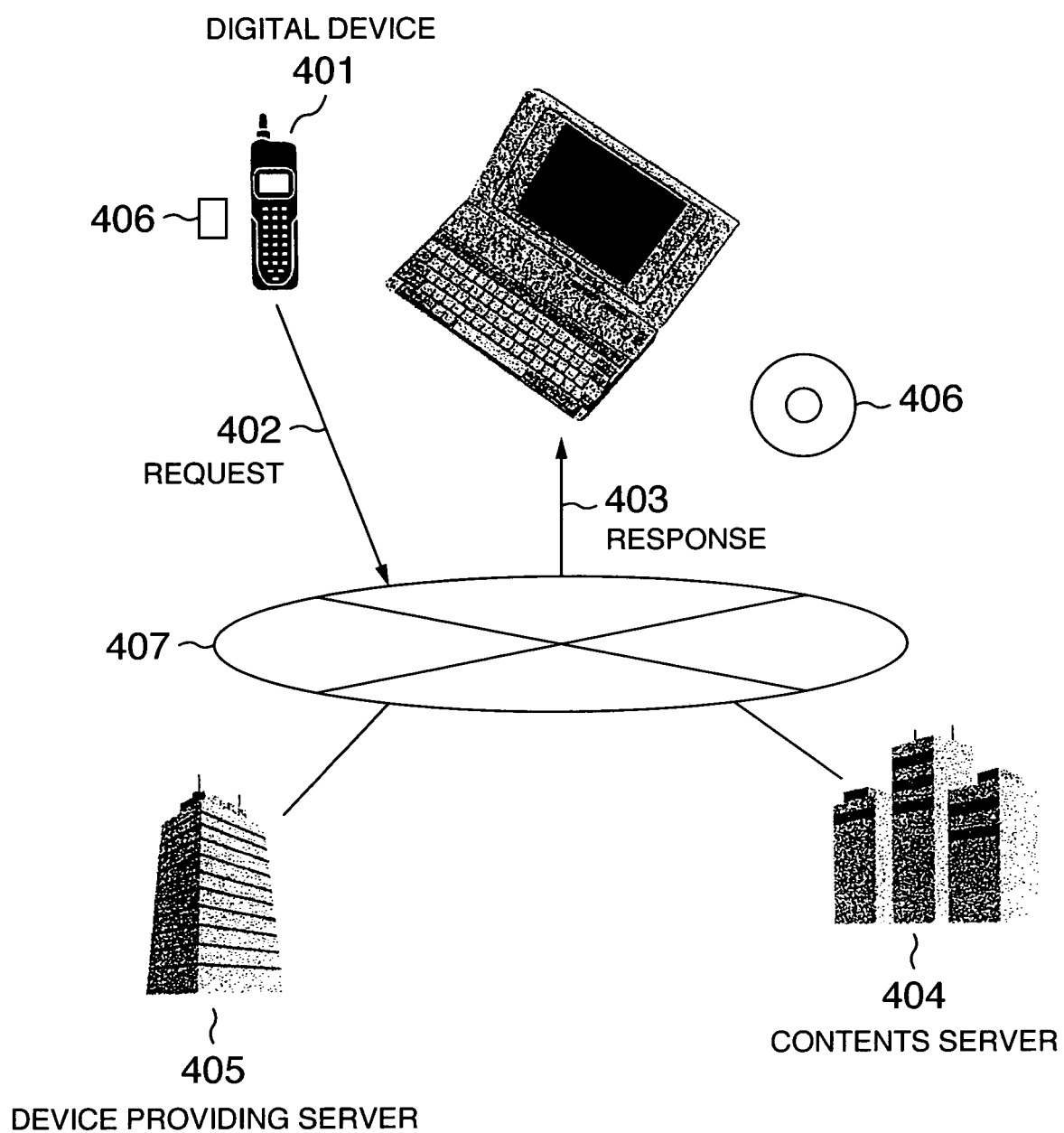
FIG. 1 is a system configuration diagram of a computer system in an embodiment of the present invention.

FIG. 1 is a system configuration diagram showing a configuration of a computer system in an embodiment of the present invention.

The present computer system includes a digital device 401, a contents server 404, and a device providing server 405.

Figure 2:
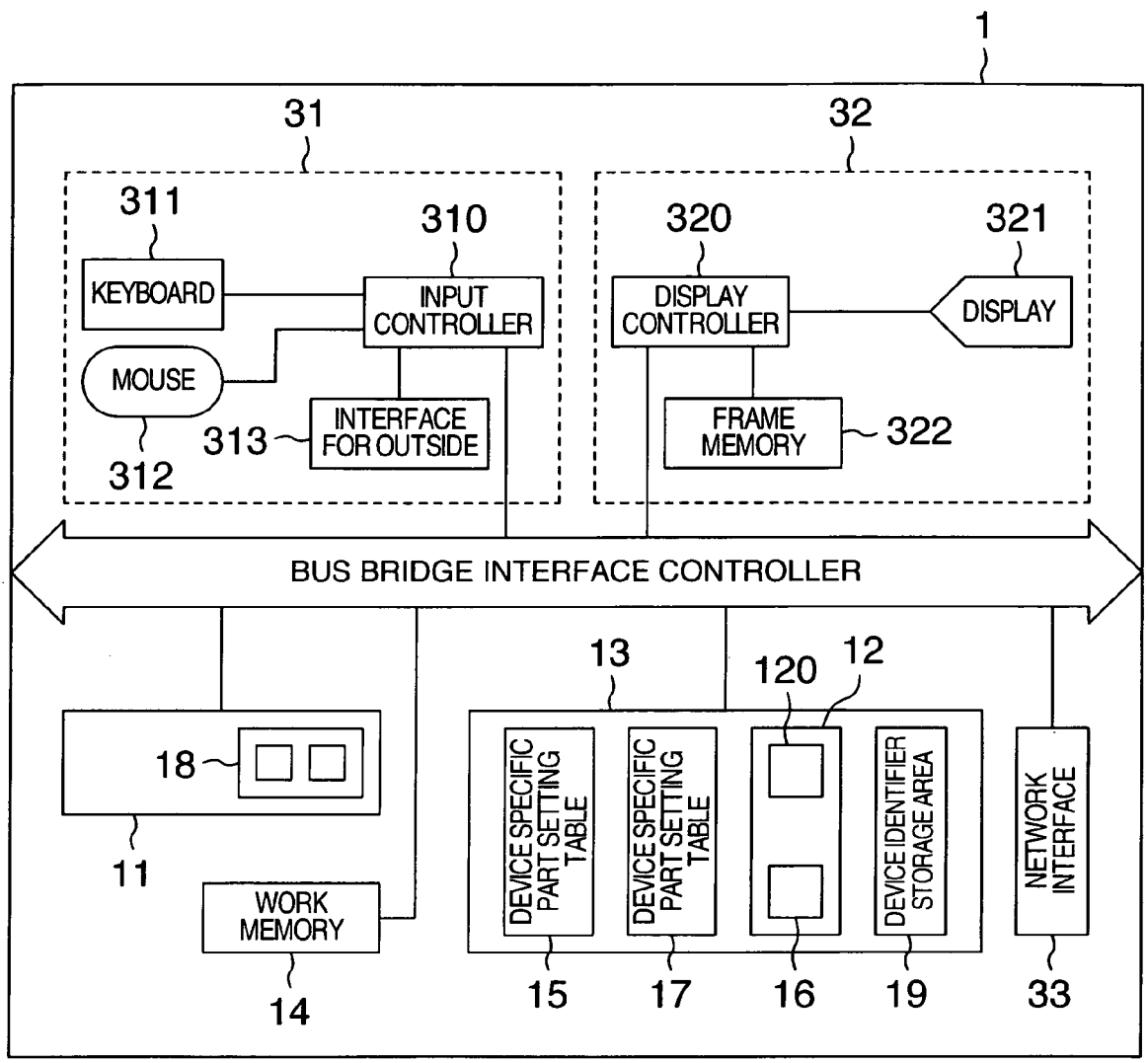
FIG. 2 is a block diagram of an asset management apparatus in an embodiment of the present invention.

The digital device 401 is an example of an asset management apparatus 1 shown in FIG. 2. The digital device 401 can reproduce contents. Specifically, the digital device 401 is a portable telephone, a personal computer (PC), a DVD player or the like. The digital device 401 acquires contents to be reproduced, from a storage medium 406 (a CD, a DVD or a memory card) or the contents server 404.

The contents server 404 is a server that provides contents, and it is a computer including a processor and a storage area.

The device providing server 405 is a server that has information specific to the digital device 401, and it is a computer including a processor and a storage area.

The digital device 401, the contents server 404 and the device providing server 405 are connected via a network 407.

FIG. 2 is a block diagram showing an example of the asset management apparatus 1 in an embodiment of the present invention. The asset management apparatus 1 includes the digital device 401 shown in FIG. 1.

The asset management apparatus 1 includes a program execution device 11, a storage device 13, a work memory 14, an input unit 31, a display unit 32, and a network interface 33. The program execution device 11, the storage device 13, the work memory 14, the input unit 31, the display unit 32, and the network interface 33 are connected by a bus bridge interface controller 30.

The network interface 33 is an interface that conducts communication with an apparatus connected to the asset management apparatus 1 via the network.

The input unit 31 includes an input controller 310, a keyboard 311, a mouse 312 and an interface for outside 313. The input controller 310 controls the keyboard 311, the mouse 312 and the interface for outside 313. The interface for outside 313 is an interface connected to an external storage medium. For example, there are a USB (Universal Serial Bus) and a memory card slot as the interface for outside 313.

The display unit 32 includes a display controller 320, a display device 321 and a frame memory 322. The frame memory 322 is a storage area for storing an image to be displayed on the display device 321. The display controller 320 controls the display device 321 and the frame memory 322.

The storage device 13 includes an asset management program 12, a device specific part setting program 15, a device specific part setting table 17 and a device identifier storage area 19.

The asset management program 12 is a program for detecting unfairness in the asset management apparatus 1. Here, "unfairness" means unfair software (for example, software containing a virus or the like and software that makes unfair copy possible) and unfair copy.

The asset management program 12 includes a common asset management part 120 and a device specific asset management module 16. The common asset management part 120 is a program that executes processing common to the asset management apparatus 1 and other devices. For example, the processing common to the asset management apparatus 1 and other devices is processing of detecting unfairness common to the asset management apparatus 1 and other devices.

On the other hand, the device specific asset management module 16 is a module that executes processing specific to the asset management apparatus 1 and other devices. For example, the processing specific to the asset management apparatus 1 and other devices is processing of detecting unfairness common to the asset management apparatus 1 and other devices. The device specific asset management module 16 may be a program that can execute singly or may be a module that is a fragmentary part and that cannot execute singly.

When the program execution device 11 executes a program, programs stored in the storage device 13 are stored in the work memory 14. The work memory 14 is typically a storage medium such as a DRAM having a fast access speed. Alternatively, the work memory 14 may be a disk device, a memory card or magnetic tape having a slow access speed.

The device specific part setting program 15 is a program for executing linkage processing which will be described later.

The device specific part setting table 17 is a table that indicates contents of the linkage processing. The device specific part setting table 17 is referred to when an interpreter in the program execution device 11 interprets and executes an instruction code.

A device identifier which is a unique identifier uniquely identifying a device is stored in the device identifier storage area 19.

The program execution device 11 is a device that executes various programs. The program execution device 11 includes a processor and a storage device which are not illustrated. Furthermore, the program execution device 11 includes an OS (Operating System) and the interpreter. The OS and the interpreter may be provided to the program execution device 11 by the storage device 13 at the time of program execution.

The program execution device 11 includes a decision result storage area 18. The decision result storage area 18 retains an execution result of the device specific asset management module 16 and an execution result of the common asset management part 120. The execution results retained in the decision result storage area 18 can be referred to by the program execution device 11.

Although the apparatus shown in FIG. 2 is illustrated as a general purpose personal computer, it may be a dedicated reproducing device.

FIG. 3 is a diagram showing an example of a table configuration of the device specific part setting table 17 in an embodiment of the present invention.

The device specific part setting table 17 includes a setting number 171, a setting subject program 172, an intra-program location 173, setting processing 174, and a subject device name 175.

The setting number 171 is a unique identifier for identifying linkage processing. The setting subject program 172 specifies a subject program of execution of the linkage processing. The intra-program location 173 identifies a location in the setting subject program 172 to which the setting processing 174 is to be linked. The setting processing 174 indicates contents of linked concrete processing. The subject device name 175 indicates a name of a subject device of execution of linkage processing.

Before the program execution device 11 interprets and executes an instruction code of a program, the program execution device 11 refers to the device specific part setting table 17 and executes the device specific part setting program 15. Specifically, the program execution device 11 makes a decision whether the program of the executed instruction code coincides with the setting subject program 172 in the device specific part setting table 17 and the intra-program location of the executed instruction code coincides with the intra-program location 173 in the device specific part setting table 17.

If the program of the executed instruction code coincides with the setting subject program 172 in the device specific part setting table 17 and the intra-program location of the executed instruction code coincides with the intra-program location 173 in the device specific part setting table 17, then the program execution device 11 refers to the setting processing 174 in the device specific part setting table 17, and executes linkage processing of replacing the instruction code with contents of the setting processing 174.

If the program of the executed instruction code does not coincide with the setting subject program 172 in the device specific part setting table 17 or the intra-program location of the executed instruction code does not coincide with the intra-program location 173 in the device specific part setting table 17, then the program execution device 11 does not execute the linkage processing, but executes the instruction code as it is.

In the device specific part setting table 17 shown in FIG. 3, linkage processing is set in a row 1710 having "1" in the setting number 171 and a row 1711 having "2" in the setting number 171.

In the row 1710, the setting subject program 172 has "asset management program" set therein, the intra-program location 173 has "address 0001" set therein, the setting processing 174 has "instruction code 1' (branch instruction to the device specific asset management module) set therein, and the subject device name 175 has "ABC-1" set therein.

Therefore, the program execution device 11 executes linkage processing of replacing an instruction code 1 in the address 0001 in the asset management program 12 with the instruction code 1' by using the device specific part setting program 15. At a head address of the asset management program 12, therefore, branching to the device specific asset management module 16 is conducted.

On the other hand, in the row 1711, the setting subject program 172 has "all" set therein, the intra-program location 173 has "all calling places in outFunction function group" set therein, the setting processing 174 has "instruction code Z (NOP instruction and so on) set therein, and the subject device name 175 has "ABC-1" set therein.

Therefore, the program execution device 11 executes linkage processing of replacing an instruction code that calls the outFunction function group with the instruction code Z (NOP) for all programs executed by the interpreter in the program execution device 11, by using the device specific part setting program 15. As a result, the outFunction is not executed.

FIG. 4 is a diagram showing an example of a program configuration of the asset management program 12 obtained before the program execution device 11 refers to the device specific part setting table 17 and executes the linkage processing.

The asset management program 12 is formed of instruction codes ranging from instruction codes 1 to 6. An address 40 is a unique identifier that identifies a location in the asset management program 12. An instruction code 41 is a unique identifier that identifies instruction contents 42. The instruction contents 42 indicate contents of the instruction code 41.

A label (LABEL 001 and LABEL 002) specifies a location in the program, and it is used to specify the branch destination.

An instruction code 1 is located in the address 0001. Contents of the instruction code 1 are "finish," and the program execution device 11 finishes the asset management program 12. In the asset management program 12, therefore, the following steps are not executed in the intact state.

An instruction code 2 is located in an address 0002. Contents of the instruction code 2 are "branch to the common asset management part," and the program execution device 11 starts processing of the common asset management part 120 shown in FIG. 7.

An instruction code 3 is located in an address 0003. Contents of the instruction code 3 are "refer to decision result," and the program execution device 11 refers to a decision result in the decision result storage area 18 which retains a decision result of the common asset management part 120 and a decision result of the device specific asset management module 16.

An instruction code 4 is located in an address 0004. Instruction contents of the instruction code 4 are "conditional branch: if it is true, branch to LABEL 2." If the decision result referred to with the instruction code 3 is "true," the program execution device 11 executes an instruction code 6 in the LABEL 2 and reproduce the contents. On the other hand, if the decision result referred to with the instruction code 3 is "false," the program execution device 11 executes an instruction code 5 in an address 0005 and finishes this processing.

The instruction code 5 is located in the address 0005. Instruction contents of the instruction code 5 are "finish," and the program execution device 11 finishes the processing using the asset management program 12.

An instruction code 6 is located in an address 0006. Instruction contents of the instruction code 6 are "start contents reproduction processing" and the program execution device 11 starts contents reproduction.

Figure 5:
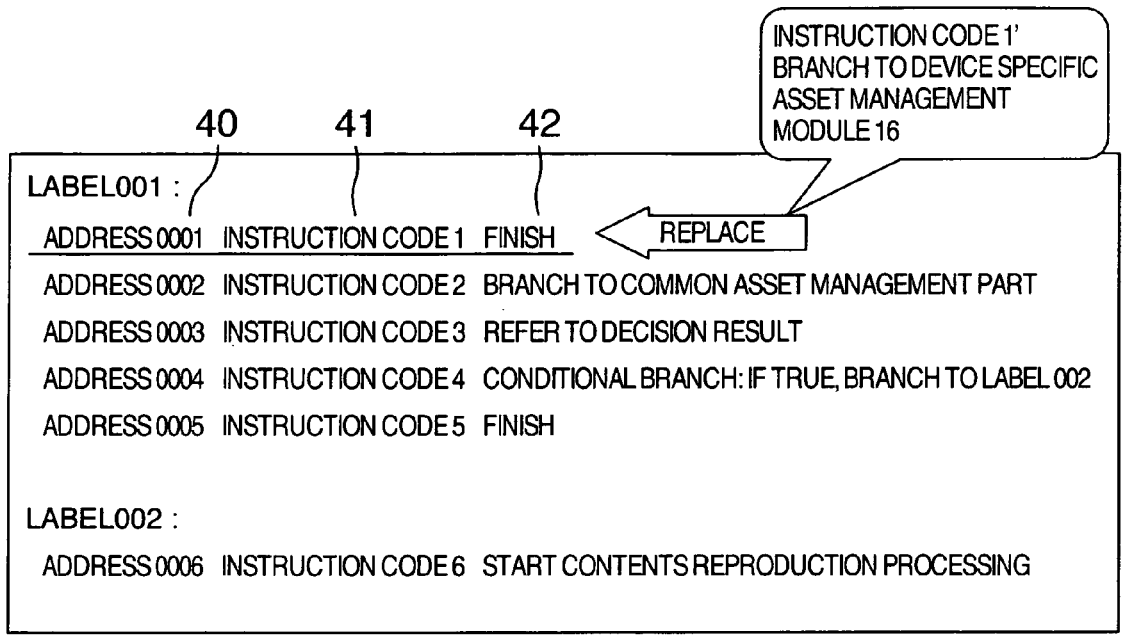
FIG. 5 is a diagram showing a program configuration of an asset management program obtained after linkage processing is executed in an embodiment of the present invention.

FIG. 5 is a diagram showing an example of a program configuration of the asset management program 12 obtained after the program execution device 11 refers to the device specific part setting table 17 and executes the linkage processing.

After reading out each instruction code and before interpreting and executing the instruction code, the program execution device executes the device specific part setting program 15. The program execution device 11 makes a decision whether each instruction code is equal to the intra-program location 173 in the row 1710 by executing the device specific part setting program 15. If as a result the instruction code is equal to the intra-program location 173 in the row 1710, then the device specific part setting program 15 executes linkage processing of replacing the instruction code with the setting processing 174. On the other hand, if the instruction code is not equal to the intra-program location 173 in the row 1710, then the device specific part setting program 15 does not execute the linkage processing. In other words, the program execution device 11 executes the instruction code as it is.

In the row 1710 having "1" in the setting number 171 in the device specific part setting table 17, the setting subject program 172 has "asset management program" set therein, the intra-program location 173 has "address 0001" set therein, and the setting processing 174 has "instruction code 1' (branch instruction to the device specific asset management module) set therein. Therefore, the device specific part setting program 15 executes linkage processing of replacing the instruction code 1 in the address 0001 in the asset management program 12 with the instruction code 1'.

Hereafter, steps in which the asset management program 12 is executed after the linkage processing has been executed by the program execution device 11 will be described.

The program execution device 11 reads out the instruction code 1 in the address 0001. Before interpreting and executing the instruction code 1, the program execution device executes the device specific part setting program 15. The program execution device 11 makes a decision whether a program containing the instruction code 1 is equal to the setting subject program 172 in the row 1710 and whether the intra-program location 173 of the instruction code 1 is equal to the intra-program location 173 in the row 1710. The program of the instruction code 1 and the intra-program location 173 of the instruction code 1 are equal to the setting subject program 172 and the intra-program location 173, respectively. Therefore, the program execution device 11 executes linkage processing of replacing the instruction code 1 in the address 0001 with the instruction code 1' by using the device specific part setting program 15. Therefore, the instruction code 1' is located in the address 0001. Instruction contents of the instruction code 1' are "branch to the common asset management part," and the instruction causes the program execution device 11 to start the processing in the device specific asset management module 16 shown in FIG. 6.

Before executing each of the instruction codes 2 to 6, the program execution device 11 executes the device specific part setting program 15 and makes a decision, in the same way as the case where the instruction code 1 is executed. Since the intra-program location of each of the instruction codes 2 to 6 is not equal to the intra-program location 173, however, the program execution device does not conduct the linkage processing. Therefore, the program execution device 11 executes each of the instruction codes 2 to 6. Contents of each of the instruction codes 2 to 6 are the same as those described with reference to FIG. 4.

Figure 6:
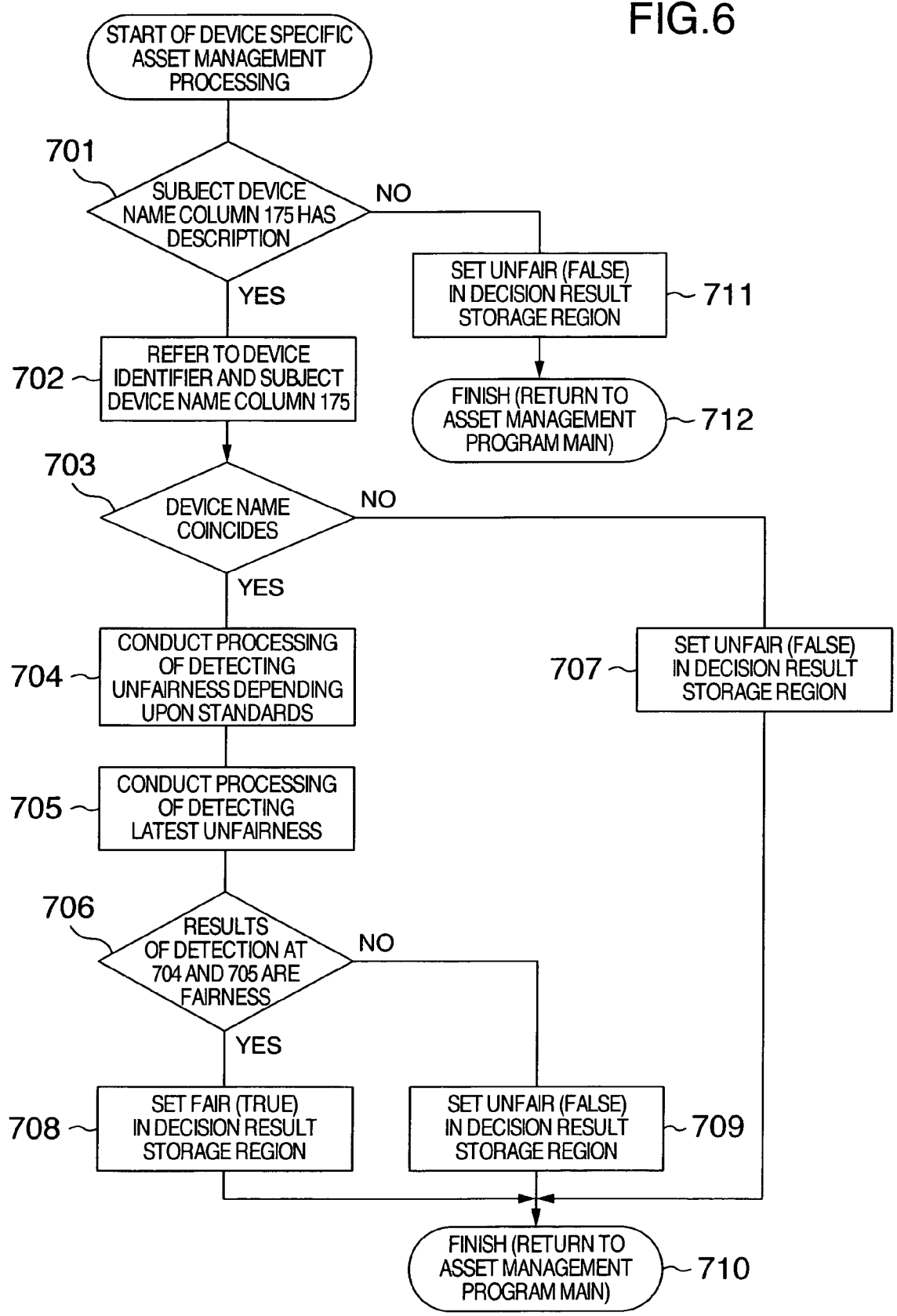
FIG. 6 is a flow chart of a device specific asset management module in an embodiment of the present invention.

FIG. 6 is a flow chart of the device specific asset management module 16.

The program execution device 11 executes the device specific asset management module 16 by using the instruction code 1' in the asset management program 12 obtained after the linkage processing shown in FIG. 5.

First, in order to make a decision whether the device specific asset management module 16 has been introduced unfairly, the program execution device 11 makes a decision whether the subject device name 175 in a row 1710 having a setting number "1" in the device specific part setting table 17 has a description of a subject device name (step 701). If there is a description in the subject device name 175 in the row 1710 having the setting number "1" in the device specific part setting table 17, the program execution device 11 judges that the device specific asset management module 16 has been introduced fairly and proceeds to step 702. On the other hand, if there is not a description in the subject device name 175 in the row 1710 having the setting number "1" in the device specific part setting table 17, the program execution device 11 judges that the device specific asset management module 16 has been introduced unfairly and proceeds to step 711.

If there is no description in the subject device name 175 at the step 701 and the device specific asset management module 16 is judged to have been introduced unfairly, then the program execution device 11 sets unfair (false) in the decision result storage area 18 (step 711), finishes the processing using the device specific asset management module 16, and returns to the processing using the asset management program 12 (step 712).

If there is a description in the subject device name 175 at the step 701 and the device specific asset management module 16 is judged to have been introduced fairly, then the program execution device 11 refers to the device identifier stored in the device identifier storage area 19 and the device name in the subject device name 175 (step 702).

Subsequently, in order to protect the copyright, the program execution device 11 makes a decision whether the device identifier represents the device name in the subject device name 175 (step 703).

If the device identifier does not represent the device name in the subject device name, then the program execution device 11 sets unfair (false) in the decision result storage area 18 (step 707), finishes the processing using the device specific asset management module 16, and returns to the processing of the asset management program 12 (step 710).

The program execution device 11 executes contents reproduction start processing of the instruction code 6 in the asset management program 12 under the condition that unfair (false) is not set in the decision result storage area 18. If the device identifier does not represent the device name in the subject device name 175, unfair (false) is set in the decision result storage area 18 at the step 707, and consequently the program execution device does not reproduce the contents. Therefore, the contents cannot be reproduced by devices other than the device having a device identifier that represents the device name in the subject device name 175. As a result, the copyright of the contents is protected.

If the device identifier represents the device name in the subject device name 175, then the program execution device 11 detects unfairness specific to that device (step 704). If the program execution device 11 does not detect unfairness, then the program execution device 11 sets fair (true) in the decision result storage area 18. On the other hand, if the program execution device 11 has detected unfairness, the program execution device 11 sets unfair (false) in the decision result storage area 18.

Subsequently, the program execution device 11 detects the latest unfairness (step 705). The "latest unfairness" means unfairness that is not coped with by a device specific asset management module 16 of a version earlier than that device specific asset management module 16. If the program execution device 11 does not detect unfairness, then the program execution device 11 sets fair (true) in the decision result storage area 18. On the other hand, if the program execution device 11 has detected unfairness, then the program execution device 11 sets unfair (false) in the decision result storage area 18.

Subsequently, the program execution device 11 refers to the decision result storage area 18, and makes a decision whether a result of device specific unfairness detection is fairness and a result of the latest unfairness detection is fairness (step 706).

If the result of the device specific unfairness detection is fairness and the result of the latest unfairness detection is fairness, then the program execution device 11 sets fair (true) in the decision result storage area 18 (step 708), finishes the processing using the device specific asset management module 16, and returns to the processing of the asset management program 12 (step 710).

If the result of the device specific unfairness detection is not fairness or the result of the latest unfairness detection is not fairness, then the program execution device 11 sets unfair (false) in the decision result storage area 18 (step 709), finishes the processing using the device specific asset management module 16, and returns to the processing of the asset management program 12 (step 710).

After returning to the asset management program 12, the program execution device 11 reads out the instruction code 2.

FIG. 7 is a flow chart of the common asset management part 120.

The program execution device 11 executes the common asset management part 120 in accordance with the instruction code 2 in the asset management program 12.

First, the program execution device 11 detects unfairness common to devices by using the common asset management part 120 (step 801). If the program execution device 11 does not detect unfairness, then the program execution device 11 sets fair (true) in the decision result storage area 18. On the other hand, if the program execution device 11 has detected unfairness, then the program execution device 11 sets unfair (false) in the decision result storage area 18.

Subsequently, the common asset management part 120 executes processing of detecting previously known unfairness (step 802). The "previously known unfairness" is unfairness that was present when the common asset management part 120 is distributed or delivered. If the program execution device 11 does not detect the previously known unfairness, then the program execution device 11 sets fair (true) in the decision result storage area 18. On the other hand, if the program execution device 11 has detected unfairness, the program execution device 11 sets unfair (false) in the decision result storage area 18.

Subsequently, the program execution device 11 refers to the decision result storage area 18 by using the common asset management part 120, and makes a decision whether a result of detection of unfairness common to devices (step 801) is fairness and a result of detection of previously known unfairness (step 802) is fairness (step 803).

If the result of the detection of unfairness common to devices is fairness and the result of detection of previously known unfairness is fairness, then the program execution device 11 sets fair (true) in the decision result storage area 18 (step 804), finishes the processing using the common asset management part 120, and returns to the processing of the asset management program 12 (step 806).

If the result of the detection of unfairness common to devices is not fairness or the result of detection of previously known unfairness is not fairness, then the program execution device 11 sets fair (true) in the decision result storage area 18 (step 805), finishes the processing using the common asset management part 120, and returns to the processing of the asset management program 12 (step 806).

After returning to the asset management program 12, the program execution device 11 reads out the instruction code 3.

Figure 8:
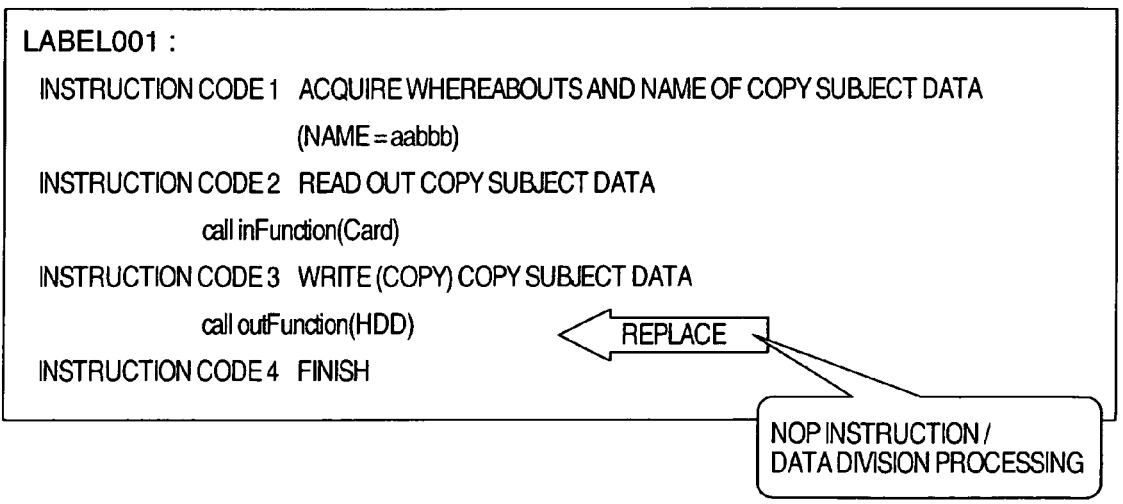
FIG. 8 is a diagram showing a program configuration of a data copy program in an embodiment of the present invention.

FIG. 8 is a diagram showing an example of a program configuration of a data copy program.

The program execution device 11 executes linkage processing of replacing an instruction code that calls the outFunction function group with the instruction code Z for all programs executed by the interpreter in the program execution device 11 in accordance with the setting in the row 1711 in the device specific part setting table 17.

The data copy program shown in FIG. 8 is stored in the storage device 13. The data copy program is a program for copying data. For example, the data copy program is a program for storing contents from a portable storage device (such as a memory card) storing contents into the storage device 13 when the contents are obtained.

The program execution device 11 reads out the instruction code 1. Before interpreting and executing the instruction code 1, the program execution device 11 executes the device specific part setting program 15. The program execution device 11 makes a decision whether the instruction code 1 is equal to the intra-program location 173 "calling place of outFunction function group" in the row 1711. Since the instruction code 1 is not the intra-program location 173 "calling place of outFunction function group" in the row 1711, the program execution device 11 does not execute the linkage processing. Therefore, the program execution device 11 executes the instruction code 1.

Subsequently, the program execution device 11 reads out the instruction code 2. The program execution device 11 makes a decision whether the instruction code 2 is equal to the intra-program location 173 "calling place of outFunction function group" in the row 1711. Since the instruction code 2 is not the intra-program location 173 "calling place of outFunction function group" in the row 1711, the program execution device 11 executes the instruction code 2.

Upon executing the instruction code 2, the program execution device 2 then reads out the instruction code 3. Before interpreting and executing the instruction code 3, the program execution device 11 executes the device specific part setting program 15. The program execution device 11 makes a decision whether the instruction code 3 is equal to the intra-program location 173 "calling place of outFunction function group" in the row 1711. Since the instruction code 3 is the intra-program location 173 "calling place of outFunction function group" in the row 1711, the program execution device 11 executes linkage processing of replacing the instruction code 3 with the instruction code Z. Therefore, the program execution device 11 interprets and executes the instruction code Z.

In other words, the program execution device 11 reads out each instruction code, and then makes a decision whether the instruction code is equal to the intra-program location 173 "calling place of outFunction function group" in the row 1711. If the instruction code is equal to the intra-program location 173 in the row 1711, the program execution device 11 executes the linkage processing of replacing that instruction code with the instruction code Z. On the other hand, if the instruction code is not equal to the intra-program location 173 in the row 1711, the program execution device 11 executes the instruction code as it is.

Therefore, the "outFunction function group calling" instruction can be changed freely according to contents of the instruction code Z. For example, if the instruction code Z is changed to "NOP instruction" which is an instruction to execute nothing, it becomes impossible for the program execution device 11 to store the contents into the storage device 13.

For example, the case where the instruction code Z is set to "contents divisional preservation" will now be described. The "contents divisional preservation" means that the program execution device 11 preserves contents while assorting the contents into two different places in an area of the storage device 13. Specifically, the program execution device 11 divides the contents fractionally by one byte, sorts the contents into contents pieces having even addresses in location from the head of the original contents and contents pieces having odd addresses, and preserves them in different places in the storage device 13. As a result, the contents are divided and preserved in the storage device 13 as two contents files.

If there is not a compounding program for restoring the divided contents to the original state, the program execution device 11 cannot reproduce the contents. Therefore, the program execution device 11 can preserve the contents in the storage device 13, but cannot reproduce the contents.

This method is effective to the case where the right to reproduce the contents and the right to record the contents are sold separately. In other words, the business company delivers the compounding program to only purchasers of the right to record. As a result, it becomes impossible to reproduce the preserved contents without the compounding program.

Hereafter, a method for acquiring the device specific asset management module 16 of the digital device 401 will be described with reference to FIG. 1.

First, the case where contents are delivered to the digital device 401 by the contents server 404 will now be described.

The digital device 401 transmits a delivery request 402 for the contents and the device specific asset management part 16 to the contents server 404. When transmitting the delivery request 402 to the contents server 404, the digital device 401 also transmits a device identifier that identifies the digital device 401 to the contents server 404.

Upon receiving the delivery request 402 and the device identifier, the contents server 404 identifies the device by referring to the device identifier. If the contents server 404 cannot identify the device by referring to the device identifier, the contents server 404 transmits the device identifier to the device providing server 405 via the network. Upon receiving the device identifier, the device providing server 405 identifies that device by referring to the device identifier and transmits the pertinent device to the contents server 404.

Upon identifying the pertinent device, the contents server 404 prepares the device specific asset management module 16 and the device specific part setting table 17 associated with the pertinent device. By the way, information as to which location in which program the subject device name 175 and the pertinent device specific asset management module 16 should be set is set in the device specific part setting table 17.

Therefore, the contents server 404 transmits the contents, the asset management program 12, the common asset management part 120, the device specific asset management module 16 and the device specific part setting table 17 to the digital device 401 as a response 403.

Upon receiving the response 403, the digital device 401 can preserve the contents and so on in the storage medium 406 such as a USB memory. However, other digital devices 401 cannot reproduce. Because the device specific asset management module 16 and the device specific part setting table 17 are specific to the digital device 401 that has transmitted the delivery request 402. Specifically, since the subject device name 175 in the device specific part setting table 17 does not coincide with names of other digital devices 401, other digital devices 401 cannot link the device specific asset management module 16 to the asset management program 12. Since the instruction code 1 in the asset management program 12 for which the linkage processing is not executed is "finish," other digital devices 401 finish the processing using the asset management program 12 without reproducing the contents. That is the reason. As a result, the copyright of the contents can be protected.

If the digital device that has received the response 403 copies the contents into a different digital device, therefore, the different digital device 401 cannot reproduce the contents.

The digital device 401 of the copy destination transmits the delivery request 402 for the device specific part asset management part 16 and the device identifier to the contents server 404 in order to make the contents reproducible. Upon receiving the delivery request 402 and the device identifier, the contents server 404 needs only discriminate the digital device of copy destination by referring to the device identifier and transmit the device specific asset management module 16 and the device specific part setting table 17 to the digital device 401. Upon receiving the device specific asset management module 16 and the device specific part setting table 17, the digital device 401 of copy destination refers to the device specific part setting table 17 when executing the asset management program 12, links the device specific asset management module 16 to the asset management program 12, and executes the linked asset management program 12.

It becomes possible for the digital device 401 of copy destination to reproduce the contents by executing the asset management program 12 obtained after the execution of the linkage processing.

When the contents provider updates the processing (step 705) of detecting the latest unfairness in the device specific asset management module 16 because of appearance of a new unfair program, the contents server 404 needs only transmit the updated device specific asset management module 16 and device specific part setting table 17 to the digital device 401 via the network, and the contents server 404 need not transmit the common asset management part that is not updated.

The updated device specific asset management module 16 and device specific part setting table 17 may be preserved in a storage medium (such as a CD, a DVD or a memory card) and distributed.

The case where the digital device 401 acquires the contents and the common asset management part 120 from the storage medium (such as a CD, a DVD or a memory card) 406 will now be described.

Upon acquiring the contents, the common asset management part 120 and the asset management program 12 from the storage medium 406, the digital device 401 transmits the delivery request 402 for the device specific asset management module 16 and the device identifier stored in the device identifier storage area 19 to the contents server 404.

Upon receiving the delivery request 402 and the device identifier, the contents server 404 discriminates the kind of the digital device 401 by referring to the device identifier. If the contents server 404 cannot discriminate the kind of the digital device 401 by referring to the device identifier, the contents server 404 transmits the device identifier to the device providing server 405 via the network. Upon receiving the device identifier, the device providing server 405 discriminates the kind of the digital device 401, and transmits information of the kind of the digital device 401 to the contents server 404.

Upon discriminating the kind, the contents server 404 transmits the device specific asset management module 16 and the device specific part setting table 17 associated with the kind of the digital device 401 to the digital device 401 as the response 403.

The digital device 401 stores the device specific asset management module 16 and the device specific part setting table 17 in the storage device 13.

By doing so, it is only necessary to store the contents and the common asset management part 120 in the storage medium 406, and it is not necessary to store the device specific asset management module 16 and the device specific part setting table 17. Therefore, the data quantity of the program and so on other than the contents stored in the storage medium 406 can be reduced. As a result, more contents can be stored in the storage medium 406.

By the way, the digital device 401 that has first acquired the contents from the storage medium 406 can preserve the contents and so on in the storage medium 406 such as a USB memory. However, other digital devices 401 cannot reproduce the contents. Because the device specific asset management module 16 and the device specific part setting table 17 depend upon the digital device 401 that has transmitted the delivery request 401. As a result, the copyright of the contents can be protected.

The digital device 401 having the contents copied from the digital device 401 that has first acquired the contents transmits the delivery request 402 and the device identifier to the contents server 404 in order to make the contents reproducible in a device other than the digital device 401 that has first acquired the contents from the storage medium 406. Upon receiving the delivery request 402 and the device identifier, the contents server 404 needs only discriminate the kind of the digital device 401 and transmit the device specific asset management module 16 and the device specific part setting table 17 to the pertinent digital device 401. Upon receiving the device specific asset management module 16 and the device specific part setting table 17, the digital device 401 of copy destination refers to the device specific part setting table 17 when executing the asset management program 12, links the device specific asset management module 16 to the asset management program 12, and executes the linked asset management program 12.

It becomes possible for the digital device 401 of copy destination to reproduce the contents by executing the asset management program 12 obtained after the linkage processing is executed by the program execution device 11.

When the contents provider updates the processing (step 705) of detecting the latest unfairness in the device specific asset management module 16 because of appearance of a new unfair program, the contents server 404 needs only transmit the updated device specific asset management module 16 and device specific part setting table 17 to the digital device 401 via the network, and the contents server 404 need not transmit the common asset management part 120 and the asset management program 12 which are not updated.

The updated device specific asset management module 16 and device specific part setting table 17 may be preserved in a storage medium (such as a CD, a DVD or a memory card) and distributed.

It is also possible to store only the contents in the storage medium 406 and transmit the asset management program 12, which includes the asset common part 120 and the device specific asset management module 16, and the device specific part setting table 17 from the contents server 404.

As heretofore described, the present invention can be utilized for a digital device having software mounted thereon with the object of improving the efficiency and effect of the asset management.

The invention claimed is:

1. An asset management method executed in an asset management system, the asset management method carried out by at least one processor unit and comprising:
   storing content on a digital device;
   transmitting, from the digital device to a delivery server, a device identifier and a delivery request for an asset management module specific to the device,
   by the delivery server, receiving the delivery request and the device identifier, and identifying, using the device identifier, part setting information specific to the device and the asset management module specific to the device,
   transmitting, by the server, the part setting information and the asset management module to the digital device;
   receiving, by the digital device, the part setting information and the asset management module for the delivery server;
   by the digital device, executing an asset management program, referring to the part setting information and linking the asset management module to the asset management program; and
   reproducing the content, by the digital device, using the linked asset management program.

2. The asset management method according to claim 1, wherein
   the digital device detects unfairness common to the digital device and another digital device other than the digital device, by executing the linked asset management program, and
   the digital device detects unfairness specific to the asset management apparatus, by executing the device-specific asset management module.

3. The asset management method according to claim 1, wherein
   when executing the linked asset management program, the digital device makes a decision whether the linked asset management program is previously set in an area that identifies a program of a processing subject of the linking, and
   if the linked asset management program is previously set in the area that identifies the program of the processing subject of the linking, the digital device replaces an instruction code in a specified location in the program to be linked with the instruction in the area that identifies the location in the program of the processing subject of the linking to which linking is to be conducted, and the digital device conducts program linking processing for the program of the processing subject of the linking.

4. The asset management method according to claim 3, wherein if the linked asset management program is not previously set in the area that identifies the program of the processing subject of the linking, the asset management apparatus does not conduct the replacement of the instruction code, but executes the instruction code in the original linked asset management program and finishes the processing.

5. An asset management system comprising:

A delivery server comprising: a server processor and a sever memory storing executable instructions that when executed by the server processor causes the server processor to perform the steps of:

receiving, from a digital device, a device identifier and a delivery request for an asset management module specific to the device, identifying using the device identifier, part setting information specific to the device and the asset management module specific to the device and transmitting, the part setting information and the asset management module to the digital device;

the digital device comprising: a device processor and a device memory storing executable instructions that when executed by the device processor to perform the steps of:

storing content;

transmitting to a delivery server, a device identifier and a delivery request for an asset management module specific to the device identifier;

receiving, part setting information specific to the device identifier and asset management module specific to the device identifier from the delivery server;

executing an asset management program, referring to the part setting information specific to the device identifier and linking the asset management module specific to the device identifier to the asset management program; and reproducing the content, using the linked asset management program.

6. The asset management system according to claim 5, wherein the linked asset management program is described by using an interpreter language.

7. The asset management system according to claim 5, wherein the linked asset management program comprises an instruction code to be linked to the asset management module specific to the device, an instruction code to branch to the common asset management part, and an instruction code to start contents reproduction processing.

8. The asset management system according to claim 5, wherein the part setting information specific to the device comprises a part setting table specific to the device, the part setting table specific to the device including a setting-subject-program area that identifies a program of a processing subject of a linking, an intra-program area that identifies a location in the program of the processing subject of the linking to which linking is to be conducted, and a setting processing area having a description of an instruction code to be linked.

* * * * *